May 15, 1962 E. B. GUSTAFSSON 3,034,534
EXPANSION VALVE
Filed July 16, 1957 3 Sheets-Sheet 3
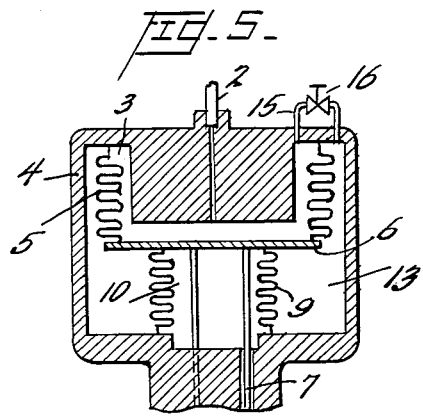
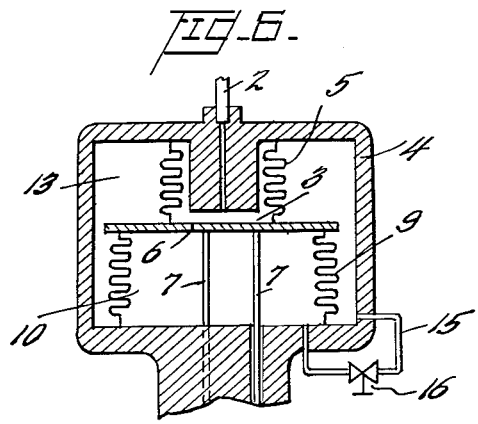
INVENTOR
Ernst B. Gustafsson,
BY Walter H. Young
ATTORNEY

United States Patent Office 3,034,534
Patented May 15, 1962

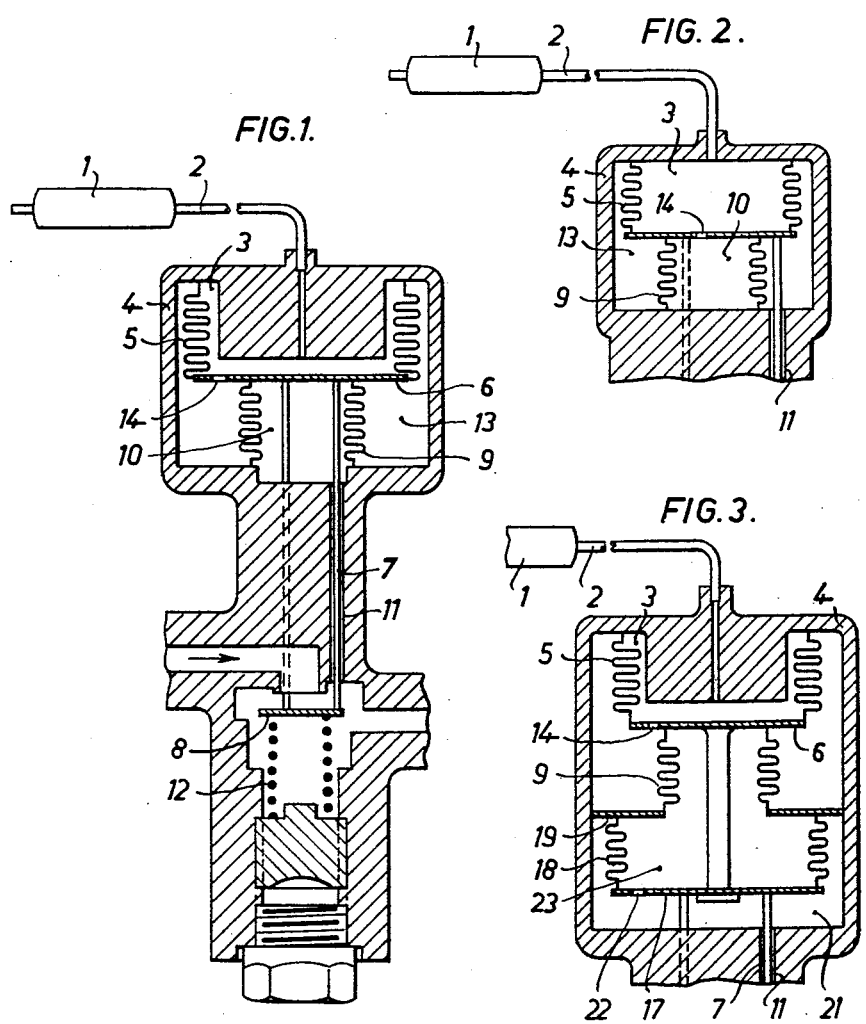

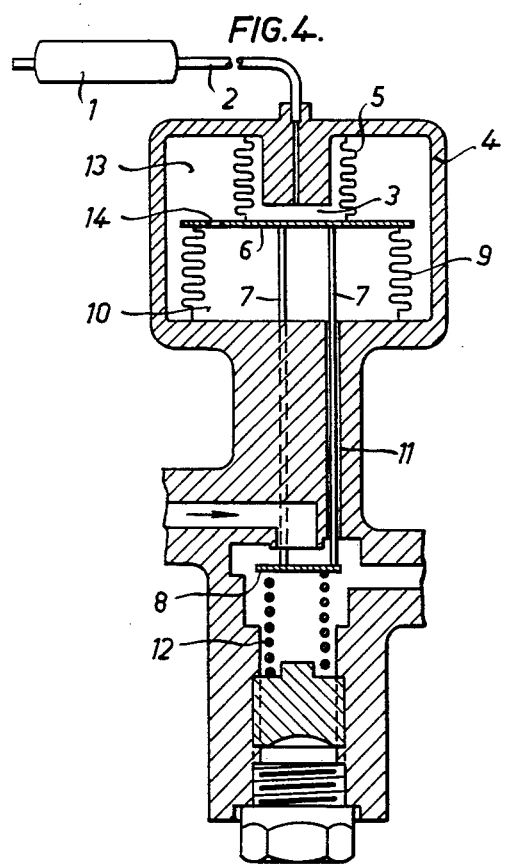

3,034,534
EXPANSION VALVE
Ernst Birger Gustafsson, Auroravagen 11,
Finspong, Sweden
Filed July 16, 1957, Ser. No. 672,260
2 Claims. (Cl. 137—781)

The present invention relates to apparatus for transforming pressure variations of a medium into movement of a device for indicating said variations.

The invention is characterized, chiefly in that the pressure variations are allowed to act on a movable partition belonging to said indicating device which separates two chambers communicating with each other via a passage way exerting a certain resistance to the flow of medium therethrough so that variations of the pressure will cause a difference in pressure between the chambers. In addition, the chambers are so arranged that the pressure existing in the chamber that first receives the medium acts on a larger area of the partition than the pressure in the other chamber in order to secure a regulation under the joint control of the pressure variations and of the rate of said variations.

The regulating apparatus according to the invention may be applied to various kinds of pressure controlled valves as well as to thermostatic expansion valves for refrigerating elements. Hereinafter, as an example, the regulating apparatus will be described as applied to a valve of the last mentioned type.

In the accompanying drawings several embodiments of thermostatic expansion valve are shown to which the invention is applied.

FIG. 1 is an axial section of an embodiment of such a valve.

FIGS. 2 and 3 are similar sections of parts of modified valves.

FIG. 4 is an axial section of a still further modified embodiment of a thermostatic expansion valve according to the invention.

FIG. 5 diagrammatically represents a modification of FIG. 1.

FIG. 6 diagrammatically represents a modification of FIG. 4.

When the amount of refrigerating medium in the evaporator of a refrigerating machine is controlled by means of a thermostatic expansion valve said valve, as a rule, operates with a view to maintaining a constant superheating of the gas escaping from the evaporator. A system including the combination of an expansion valve and an evaporator is, however, stable only under exceptional circumstances and oscillations usually appear both as far as the evaporation temperature and the superheating effect are concerned. In case of a high superheating effect the oscillations are of a neglectable magnitude, so that they do no harm. If it is desired, on the other hand, to use the evaporator effectively, that is to say, with the smallest possible superheating effect, the amplitude of the oscillations may increase considerably, at times up to twice that of the superheating to which the system is set, whereas at other times it may sink to naught with a resulting entrance of refrigerating medium in liquid state into the suction conduit of the evaporator. This being a drawback which cannot be tolerated, the superheating must be so adjusted that under all conditions only dry gas may escape from the evaporator. As a result it cannot be worked with the superheating calculated but a higher superheating must be used which yields a reduced efficiency in respect to the entire plant.

A usual thermostatic expansion valve includes a feeling body containing gaseous as well as liquid phases of a volatile medium and is mounted so as to respond to the temperature of the gas escaping from the evaporator. If the temperature of said gas varies, then the pressure prevailing in the feeling body will change. This change in pressure is transferred to a pair of bellows or a diaphragm controlling the valve body. An increase of the pressure within the feeling body opens the valve and a decrease shuts it.

Owing to heat transfer resistance existing between the superheated gas and the feeling body as well as owing to resistance appearing in the capillary pipe etc., there will be a loss of time between superheating and valve adjustment which causes a permanent oscillation.

With a controlling apparatus according to the invention a stabilizing effect may be secured by putting the valve body under the joint control of the pressure in the feeling body and the rate of change of said pressure. By designing the apparatus so that a rapid change of the superheating effect may cause a greater change of the position of the valve body than does a slow change, the time loss appearing in the operation of the valve may be compensated for so that any oscillation may be soon depressed.

With reference to FIG. 1 of the drawing, the numeral 1 indicates a feeling member communicating through a capillary pipe 2 with a chamber 3 of the regulating apparatus. Said chamber is bounded by a pair of bellows 5 attached at one end to a housing 4 and supporting at the other end a partition 6. Said partition supports by means of rods 7 a valve body 8 which controls the supply of refrigerating medium to an evaporator, not shown.

Provided below partition 6 is another pair of bellows 9 enclosing a chamber 10 which communicates with the evaporator pressure through holes 11 formed in the body of the housing 4 for the accommodation of the rods 7. The pressure prevailing in the chambers is balanced by a compression spring 12 acting on the under side of the valve body 8. Between the walls of the housing 4 and the bellows 5 and 9 there is a chamber 13.

Formed in the partition 6 is a passage 14 through which the chambers 3 and 13 communicate with each other. The object of this passage way will be evident from the description hereinafter to follow.

Should the superheating effect increase at such a slow rate that the increases of pressure in the chambers 3 and 13 are practically contemporaneous, the valve body 8 will be moved to open position under the control of the pressure difference acting on the portion of the partition situated above the pair of bellows 9. If, on the other hand, the superheating effect would increase rapidly the pressure will not have time enough in the beginning to be equalized and, as a result, there will be a difference in pressure acting on the whole area of the partition, that is to say, there will result an increased opening power as compared with the case already described. In case of a sudden decrease of the superheating effect the pressure inside chamber 3 will decrease rapidly and owing to the resistance exerted in the passage way 14, the pressure in chamber 13 will remain to begin with, whereby a difference in pressure will act on the whole area of the partition 6 in a direction to shut the valve. In case of a slowly increasing superheating effect the shutting power will be reduced. In this way a regulation may be yielded under the joint control of the variations in pressure and the rate of said variations, whereby oscillations in the regulation may soon be suppressed.

Without departing from the principle of the invention the regulating apparatus may be modified in various ways.

FIG. 2 shows part of a modified structure in which the chamber 10 surrounded by the bellows 9 is in communication with the chamber 3 via the passage way 14 in the partition 6, whereas the chamber 13 external of the bellows 5 and 9 is in communication with the holes 11 leading to the evaporator pressure, that is to say, the connections of chambers 10 and 13 are the reverse of those shown in FIG. 1.

As shown in FIG. 3 the regulating apparatus may be provided with an additional movable partition 17 connected by a pair of bellows 18 to an annular stationary wall 19 projecting from the circumferential wall of the housing 4. To the inner periphery of said annular wall 19 the lower edge of the pair of bellows 9 is attached. The movable partitions 6 and 17 are rigidly connected by means of a rod 20 so that they always move together.

The pair of bellows 18, the additional partition 17 and the housing 4 form together the walls of a chamber 21 which communicates via the holes 11 for the accommodation of the rods 7 with the refrigerating medium passage behind the expansion valve, not shown. The passage way 14 in the partition 6 connects in this case, the chambers 3 and 13 with each other similarly as in FIG. 1. The partition 17 is formed with a passage way 22 through which the chamber 21 is in communication with a chamber 23 surrounded by the bellows 9 and 18. By this means which acts in the same way as above described in connection with the embodiments having only a simple partition 6, the position of the valve body 8, not shown, will depend also on the rate of change of the refrigerating medium pressure behind said valve.

In FIG. 4 a thermostatic expansion valve for refrigerating machines is shown which may yield a regulating action under the joint control of the changes of the pressure of the refrigerating medium behind the valve 8 and the rate of said changes. If the pressure of the refrigerating medium increases rapidly a difference in pressure will appear between chambers 10 and 13 owing to the throttling effect caused by the passage way 14 with a resulting rapid shutting of valve 8. When a slow change of pressure occurs the pressures in the chambers 10 and 13 will be practically equally high and the position of valve 8 will depend only on the difference in pressure existing between the chambers 3 and 10. As will appear from the drawing the embodiment of FIG. 4 differs from that of FIG. 1 merely by the fact that the passage way 14 connects chamber 10 to chamber 13.

Instead of providing a passage way 14 in the partition 6 as a communication between the chambers 3 and 13 situated on opposite sides of said partition a connecting pipe 15 may be provided between said chambers, as indicated in FIG. 5. By inserting a valve 16 in said pipe the area of passage may be arbitrarily adjusted.

The embodiment illustrated in FIG. 6 is similar to that of FIG. 4 except that in place of the passage way 14 an external connecting pipe 15 with a valve 16 inserted therein is provided.

I claim:
1. In a regulating system for controlling the movement of a movable body in dependence on variations in the pressure of a fluid medium, a casing, a movable partition in said casing, a bellows flexibly connecting the partition to the inside wall of the casing for bounding a first chamber on one surface of the partition, another bellows flexibly connecting the partition to the inside wall of the casing for bounding a chamber on the opposite surface of the partition, the remainder of the casing comprising a third chamber around said two pairs of bellows, said first chamber having a larger area exposed to said partition than does said third chamber, means for admitting the pressure of the fluid medium and its variations to the first chamber to allow it to act on the relatively large area of the surface of the partition exposed to said chamber, said partition having a restricted opening formed in it for providing a restricted communication between the first chamber and said third chamber, said third chamber being closed except for said communication, and a rigid connection between the partition and the body to be controlled.

2. In a regulating system for controlling the movement of a movable body in dependence on variations in the pressure of fluid medium, a casing, a movable partition located in said casing, a first flexible means connected with one surface of said partition and with the inside wall of the casing for bounding a first chamber on said one surface of said partition, other flexible means connecting said partition to the inside wall of the casing for bounding a second chamber on the opposite surface of said partition, whereby a further chamber is formed outside said flexible means to which latter part of one surface of the partition is exposed, the area of said partition bounded by said first-mentioned flexible means being larger than that bounded by said second-mentioned flexible means, means for admitting the pressure of the fluid medium and its variation to the first chamber to allow it to act on said larger area of the surface of the partition, the corresponding area on the opposite surface of said partition being exposed to the interior of said second and further chambers, a restricted communication between the first chamber and one of said other chambers, to which a smaller area of the opposite surface of the partition is exposed, and a rigid connection between the partition and the movable body to be controlled.

References Cited in the file of this patent

UNITED STATES PATENTS

| | | |
|---|---|---|
| 1,853,273 | Hoffman | Apr. 12, 1932 |
| 2,005,773 | Florez | June 25, 1935 |
| 2,117,800 | Harrison et al. | May 17, 1938 |
| 2,165,741 | Wolfert | July 11, 1939 |
| 2,227,760 | Newcum | Jan. 7, 1941 |
| 2,382,283 | Barnett | Aug. 14, 1945 |
| 2,670,609 | Matteson | Mar. 2, 1954 |
| 2,701,451 | Candor | Feb. 8, 1955 |